United States Patent
Arakawa et al.

[11] Patent Number: 5,999,513
[45] Date of Patent: Dec. 7, 1999

[54] OPTICAL DISC SUBSTRATE HAVING RELATIVELY THICKER CENTRAL SUPPORTING PORTION AND RELATIVELY THINNER RECORDING PORTION

[75] Inventors: Nobuyuki Arakawa; Masanobu Yamamoto, both of Kanagawa, Japan

[73] Assignee: Sony Corporation, Tokyo, Japan

[21] Appl. No.: 09/046,767

[22] Filed: Mar. 24, 1998

[30] Foreign Application Priority Data

Mar. 25, 1997 [JP] Japan .................................... 9-072353

[51] Int. Cl.$^6$ ........................................ G11B 3/70
[52] U.S. Cl. ............................ 369/282; 369/290
[58] Field of Search .................. 369/290, 289, 369/282, 272, 273, 292

[56] References Cited

U.S. PATENT DOCUMENTS

| | | | |
|---|---|---|---|
| 2,846,230 | 8/1958 | Richter .................................. | 369/290 |
| 3,132,866 | 5/1964 | Niti et al. .............................. | 369/290 |
| 4,910,624 | 3/1990 | Peeters .................................. | 360/133 |
| 5,323,381 | 6/1994 | Takahashi et al. ..................... | 369/282 |
| 5,448,547 | 9/1995 | Minoda et al. ........................ | 369/280 |
| 5,541,910 | 7/1996 | Tanaka et al. ......................... | 369/290 |

*Primary Examiner*—Tan Dinh
*Attorney, Agent, or Firm*—Hill & Simpson

[57] ABSTRACT

An optical disc substrate having a reduced thickness and sufficient rigidity is provided which can be of a single-plate structure. It can be compatible with a magneto-optic recording and also with a conventional disc driving means. The substrate consists of a disc supporting portion (21) formed around the center of the substrate and of which one side (21a) provides a surface at which the disc is to be mounted on a disc driving means, and a recording portion (22) formed between the disc supporting portion (22) and a circumference of the substrate and of which one side (22a) provides a recording surface. The disc supporting portion (21) is designed thicker than the recording portion (22) so that the disc supporting surface (21a) and the recording surface (22a) will not lie together in a sample plane. A recess 25 may be formed between the recording portion (22) and disc supporting portion (21), and also a projection (27) may be formed along the circumference of the side (22b). Furthermore, one or more functional layer may be formed on the side (22b) opposite to the recording surface.

21 Claims, 4 Drawing Sheets

OPTICAL DISC SUBSTRATE HAVING RELATIVELY THICKER CENTRAL SUPPORTING PORTION AND RELATIVELY THINNER RECORDING PORTION

BACKGROUND OF THE INVENTION

1. Field of the Invention

The present invention relates to an optical disc substrate consisting of a disc supporting portion formed around the center thereof and of which one side provides a disc supporting surface, and a recording portion formed between the disc supporting portion and a circumference thereof and of which one side provides a recording surface, and an optical disc incorporating this optical disc substrate. More particularly, it concerns with an optical disc substrate in which the thickness of the disc supporting and recording portions can be determined to attain a high density of recording while maintaining a sufficient rigidity without easy warping of the substrate, and an optical disc incorporating the optical disc substrate.

2. Description of Related Art

These days, researches and developments of various optical information recording systems have been made everywhere in the field of information recording. The optical information recording system is advantageous in many respects. For instance, information can be recorded and reproduced with no contact with a read/write head, information can be recorded with a density higher more than one order of magnitude than the conventional magnetic recording system, and there are available various types of media, such as read-only, recordable and rewritable. As a recording system enabling an inexpensive, large-capacity filing, many application are expected of the optical information recording system to meet industrial needs and home or personal demands.

Among others, the compact discs (CD) and optical video discs (DVD), of the read-only type, have been widely used.

More specifically, a CD comprises an optical disc substrate being a transparent one having formed thereon a pattern of convexities and concavities such as pits and grooves indicative of information, a reflective layer made of a metal film such as aluminum film, and a protective layer formed on the reflective layer to protect the latter against moisture and $O_2$ in the atmosphere. To reproduce or read information from such an optical disc, a reading light such as laser light is irradiated onto the convexity and concavity pattern from the optical disc substrate side, and the information is detected based on a difference in reflectivity between the incident and return lights.

Recently, a higher density of information recording has been required. To meet this demand, it has been proposed, in a tendency that a light of a shorter wavelength is adopted in reading/writing of optical discs, to use a means for increasing the numerical aperture (NA) of an objective lens provided in an optical pick-up and through which a reading light of a certain wavelength is irradiated to an optical disc, to decrease the light spot diameter. For instance, the NA of objective lens used in an optical disc drive for CD is 0.46, but that of an objective lens used in a player for DVD having recently been catching people's attention for its recording capacity 6 to 8 times higher than CD, is about 0.60.

As the NA of the objective lens is larger as mentioned above, an optical disc substrate through which an irradiated reading light is transmitted should have an increased thickness.

That is, with an objective lens having a larger NA, a larger astigmatic aberration will be caused by a tilt of an optical disc surface with respect to an optical axis of an optical pick-up and thus the tilt angle allowance for the disc surface will be smaller. Note that the tilt angle for CD is 0.6° or less while that for DVD is 0.4° or less.

The allowance of the tilt angle can be determined from a relation 1/(optical disc substrate thickness)×$NA^3$, and thus it will easily be affected by the thickness of an optical disc substrate and NA of an objective lens. Namely, when an objective lens having a larger NA is used, the thickness of optical disc substrate should be smaller for a maximum possible allowance of tilt angle.

To meet such requirements, the optical disc substrate for CD is on the order of 1.2 mm while that for DVD is about 0.6 mm.

However, an optical disc substrate having a reduced thickness will have a correspondingly decreased rigidity. Generally, a plate has a flexural rigidity proportional to the third power of its thickness. Therefore, when a plate has the thickness reduced to ½of its original one, its rigidity will be ⅛of the original one. Thus, for DVD to keep a sufficient rigidity, they are made of two laminated optical disc substrates attached to each other.

However, to assure a sufficient rigidity of the optical disc by such a method, a process of lamination not required for manufacturing an optical disc substrate usable as a single-plate structure will add to the processes of optical disc substrate production, whereby the productivity will be lower. When producing an optical disc having a double-plate structure in which one of the substrates has a recording layer while the other substrate is a dummy one to reinforce the rigidity of the optical disc, the manufacturing costs will be increased while the productivity be lowered.

As discussed in the above, an optical disc substrate for use in magneto-optic recording using a magnetic field modulation should be of a single-plate structure. The above-mentioned laminated optical disc substrate cannot be used for magneto-optic recording based on the magnetic field modulation.

In these circumstances, an optical disc using a single thin substrate has been demanded increasingly more.

However, when an optical disc using a single thin substrate is played with a DVD-oriented disk driving means to spin the optical disc, the disk driving means cannot catch the optical disc by in the direction of the disc thickness a chucking mechanism thereof. Thus, such an optical disc is not compatible with any other disk driving means than dedicated for the optical disc itself. It will be necessary to provide a new disk driving means for such an optical disc, which however will disadvantageously lead to an increased running cost.

SUMMARY OF THE INVENTION

Accordingly, the present invention has an object to overcome the above-mentioned drawbacks of the prior art by providing an optical disc substrate being thin while having a sufficient rigidity, usable in magneto-optic recording and compatible with a disk driving means conventionally used in playing other types of optical discs, and an optical disc incorporating the optical disc substrate.

The above object can be accomplished by providing an optical disc substrate comprising, according to the present invention, a disc supporting portion formed around the center thereof and of which one side provides a disc supporting surface at which the optical disc is to be mounted on a disc driving means; and a recording portion formed between the disc supporting portion and a circumference thereof and of which one side provides a recording surface on which information is to be recorded; the optical disc substrate being designed for the disc supporting portion to be thicker than the recording portion so that the disc supporting surface of the disc supporting portion and the recording surface of the recording portion will not lie together in a same plane.

To cope with a higher NA, the optical disc substrate according to the present invention may be designed to have a thinner recording portion. The optical disc substrate as a whole can keep a sufficient rigidity to be of a single-plate structure. Thus, it can be used in a magneto-optic recording. Furthermore, by selecting a suitable thickness for the disc supporting portion, the optical disc substrate according to the present invention is made compatible with a disc driving means conventionally used with CD and DVD.

Also the above object can be accomplished by providing an optical disc incorporating, according to the present invention, an optical disc substrate comprising a disc supporting portion formed around the center thereof and of which one side provides a disc supporting surface at which the optical disc is to be mounted on a disc driving means; and a recording portion formed between the disc supporting portion and a circumference thereof and of which one side provides a recording surface on which information is to be recorded; the optical disc substrate being designed for the disc supporting portion to be thicker than the recording portion so that the disc supporting surface of the disc supporting portion and the recording surface of the recording portion will not lie together in a same plane.

Also, one or more functional layer may be formed on at least a side opposite to the recording surface of the recording portion. By selecting a suitable material for forming the functional layer, it is possible to suppress a warping or deflection of the optical disc substrate, caused by a temperature change, layer stress when the layer is formed, etc.

BRIEF DESCRIPTION OF THE DRAWINGS

These objects and other objects, features, aspects and advantages of the present invention will become more apparent from the following detailed description of the preferred embodiments of the present invention when taken in conjunction with the accompanying drawings, of which.

DETAILED DESCRIPTION OF THE PREFERRED EMBODIMENTS

Figure 1:
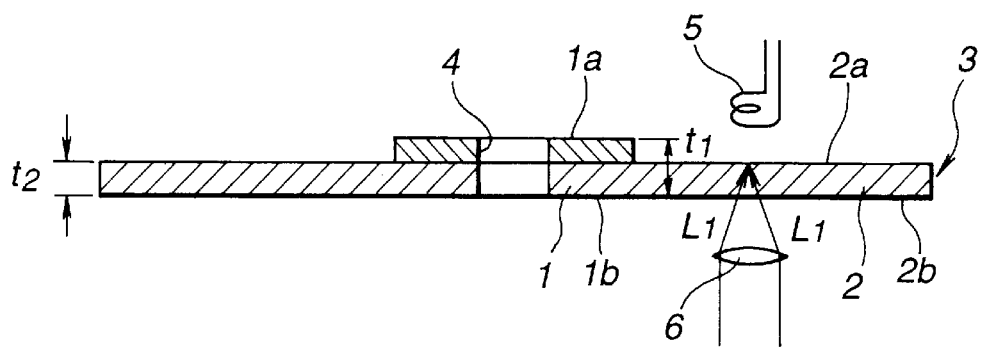
FIG. 1 is a schematic sectional view of a first embodiment of the optical disc substrate of the present invention, showing the essential portion thereof.

FIG. 1 shows the first embodiment of the optical disc according to the present invention. The optical disc has a diameter of 120 mm, for example. It comprises an optical disc substrate 3 consisting of a disc supporting portion 1 formed around the center thereof and of which one side 1a provides a disc supporting surface at which the optical disc is to be mounted on a disc driving means, and a recording portion 2 formed between the disc supporting portion 1 and a circumference thereof and of which one side 2a provides a recording surface on which information is to be recorded.

On the supposition that the disc supporting portion 1 has a thickness of $t_1$ and the recording portion 2 has a thickness of $t_2$, the optical disc substrate 3 is designed to have such a structure that $0.6 < t_1 \leq 1.2$, $0.570 \leq t_2 \leq 0.643$ and $t_1 > t_2$.

In this embodiment, the optical disc substrate 3 is also designed so that the side 1a of the disc supporting portion 1, at which the optical disc is to be mounted on a disc driving means, and the side 2a of the recording portion 2 do not lie together in a same plane. Of the optical disc substrate 3, the side 1b of the disc supporting portion 1 opposite to the side 1a being the disc supporting surface is contiguous to the side 2b of the recording portion 2 opposite to the side 2a being a recording surface and thus the sides 1b and 2b form together a same plane. Therefore, supposing that the disc supporting portion 1 and recording portion 2 have the above-mentioned thickness, the side 1a being a disc supporting surface and the side 2a being a recording surface will not lie together in a same plane.

It should be noted that the optical disc substrate 3 forming the optical disc of the present invention has formed in the center thereof a hole 4 of 15 mm in diameter for fixing the disc to a disc driving means.

That is, since the recording portion 2 of the optical disc substrate 3 is designed thin, the optical disc of the present invention is compatible with an optical system of a high NA (numerical aperture) in an optical disc drive. Moreover, since the thick design of the disc supporting portion 1 enhances the rigidity of the entire optical disc substrate 3, the optical disc of the present invention can be of a single-plate structure.

It should be appreciated that the optical disc of the present invention should preferably have a layer of an ultraviolet-settable resin be formed on the side 2b of the substrate 3 opposite to the side 2a being the recording surface. The optical disc substrate is likely to be deformed or warped due to a change of ambient conditions such as temperature, humidity if the disc structure is not symmetrical. However, the ultraviolet-settable resin layer formed over the side 2b can prevent the optical disc substrate 3 from absorbing moisture in the atmosphere to inhibit the optical disc substrate 3 from being deformed due to a change of the ambient humidity.

Moreover, since the optical disc according to this embodiment uses only the optical disc substrate 3 of the single-plate structure, a magnetic head 5 can be placed near the side 2a being the recording surface of the recording portion 2. Therefore, the optical disc of the present invention can be used for magneto-optic recording of a magnetic field modulation type.

It should be noted that for application of this embodiment for magneto-optical recording, the optical disc has formed on the side 2a a recording layer as well as a dielectric layer of SiN or the like. When the dielectric layer is thus formed, a layer stress and temperature change will cause the side 2a having the dielectric layer formed thereon to shrink, so that the optical disc substrate 3 is likely to warp. To avoid such deformation, this embodiment of the optical disc according to the present invention should preferably have a layer of SiN or $S_iO_2$ formed on the side 2b opposite to the side 2a being the recording surface. Thus, a warping likely to occur on either side of the optical disc substrate 3, caused by a layer stress and temperature change, will cancel each other so that the entire optical disc can be prevented from warping. Also, by properly selecting a refractive index and thickness of such layers, the layers can be allowed to serve as a reflection-preventive or scratch-protective layer.

Further, when the disc supporting portion 1 of this optical disc is designed to have a thickness $t_1$ of about 1.2 mm, a disk driving means used in a disc drive for CD and DVD can be used in common to drive the optical disc of the present invention, which is desirable for keeping the running cost from increasing.

Also, for reading or reproducing information from the this embodiment of the optical disc according to the present invention, a reading light $L_1$ is irradiated through an objective lens 6 onto the recording surface from the side 2a of the recording portion 2 as shown in FIG. 1. When the recording portion 2 is designed to have a thickness $t_2$ of 0.6 mm or so in this embodiment of the optical disc, an objective lens used in an optical disc drive for DVD can be commonly used for reading information from this optical disc, which is also desired against an increased running cost.

Therefore, a disk driving means and reproducing system of an optical disc drive for DVD can also be used to play this embodiment of optical disc, which will lead to a low running cost.

Furthermore, because of the single-plate structure of the substrate 3 in the optical disc of the present invention, the laminating process required for a conventional optical disc having a double-plate laminate structure is not required for the present invention. Thus the optical disc according to the present invention can be manufactured with a half of the material cost as well as with a higher productivity.

Also the optical disc substrate 3 according to the present invention weighs a half of such a conventional optical disc structure having the double-plate laminate structure. Namely, a driving spindle of a disc driving means is applied with only a half of the weight of such a conventional optical disc, and thus the surface deflection of the disc being spun can be suppressed correspondingly.

Figure 2:
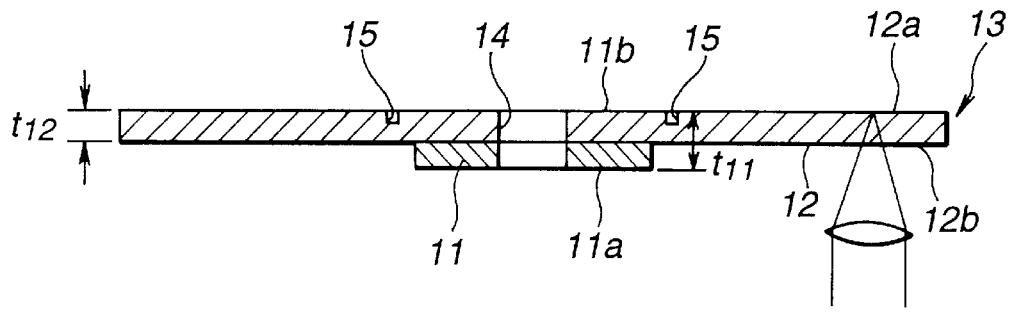
FIG. 2 is a schematic sectional view of a second embodiment of the optical disc substrate of the present invention, showing the essential portion thereof.

FIG. 2 shows the second embodiment of the optical disc according to the present invention. The optical disc has a diameter of 120 mm, for example. It comprises an optical disc substrate 13 consisting of a disc supporting portion 11 formed around the center thereof and of which one side 11a provide a disc supporting surface at which the optical disc is to be mounted on a disc driving means and a recording portion 12 formed between the disc supporting portion and a circumference thereof and of which one side 12a provides a recording surface.

Supposing that the disc supporting portion 1 has a thickness of $t_{11}$ and the recording portion 12 has a thickness of $t_{12}$, the optical disc substrate 13 is designed to have a structure in which $0.6 \leq t_{11} \leq 1.2$, $0.570 \leq t_{12} \leq 0.643$ and $t_{11} > t_{12}$.

In this embodiment, the optical disc substrate 13 is also designed so that the side 11a of the disc supporting portion 11 at which the optical disc is to be mounted on a disc driving means and the side 12a of the recording portion 12 will not coexist in a same plane. Of this optical disc substrate 13, the side 11b is contiguous to the side 12a of the recording portion 12 being a recording surface, and also the side 11a being a disc supporting surface at which the disc is to be mounted on a disc driving means and the side 12a of the recording portion 12 will not lie together in a same plane.

It should be noted that the optical disc substrate 13 of the present invention has formed in the center thereof a hole 14 of 15 mm in diameter for fixing the disc to a disc driving means.

The optical disc substrate 13 has an annular recess 15 formed therein between the side 11b of the disc supporting portion 11 and the side 12a of the recording portion 12.

Generally, the optical disc substrate 13 of the present invention is manufactured using an injection molding or the like. In such an injection molding of a structure with a central portion having one thickness and a peripheral portion having another thickness, it is likely that in a mold, a resin for a thick portion of a product will flow in a different manner from the resin for a thin portion and also volumetrically shrink at a different rate from the thin portion as the resin is cooled and set. Thus, these portions of the product will take different shapes from designed and expected ones of the mold cavity wall. Disadvantageously, the thick portion will incur a so-called sink while the thin portion will take a so-called propeller-like molded shape or a similar shape. Thus, an increased birefringence and other defects will be caused in such an optical disc substrate molded in such a manner.

On the other hand, the annular recess 15 formed between the disc supporting portion 11 and recording portion 12 of the optical disc substrate 13 according to the present invention serves as a secondary gate at the time of molding the optical disc substrate 13, which will eliminate the above-mentioned disadvantages.

That is, the second embodiment of the optical disc substrate 13 shows a same effect as the aforementioned first embodiment of the optical disc substrate 3 shown in FIG. 1, and has no such molding-caused problems because the annular recess 15 is formed in the substrate 13.

Further, when the disc supporting portion 11 of this optical disc substrate 13 is designed to have a thickness $t_{11}$ of about 1.2 mm and the recording portion 12 is to have a thickness $t_{12}$ of 0.6 mm or so, a disc driving means used in a disc drive for CD and DVD can be used commonly to drive the optical disc of the present invention, which is desirable against an increased running cost.

In the optical disc substrate 13, the side 12a being the recording surface is formed at a position about 1.2 mm off the side 11a being the disc supporting surface, so that the optical disc of the present invention is compatible with a reproduction system used in a CD player, which is also desired against an increased running cost.

Therefore, the optical disc according to the present invention is compatible with a disk driving means and reproduction system for other types of optical discs, namely, with a CD player. Desirably, this fact will not lead to an increased running cost.

Moreover, in this embodiment of the optical disc substrate 13, the side 11a of the recording portion 11, at which the disc is to be mounted on a disc driving means, protrudes from the side 12b of the recording portion 12, so the side 12b will not easily be scratched.

In the aforementioned first and second embodiments of the optical disc substrates 3 and 13 according to the present invention, there is provided a gap of about 0.6 mm (1.2 mm) between the disc supporting surface and the recording surface. However, any other suitable gap may be selected to an intended purpose.

Figure 3:
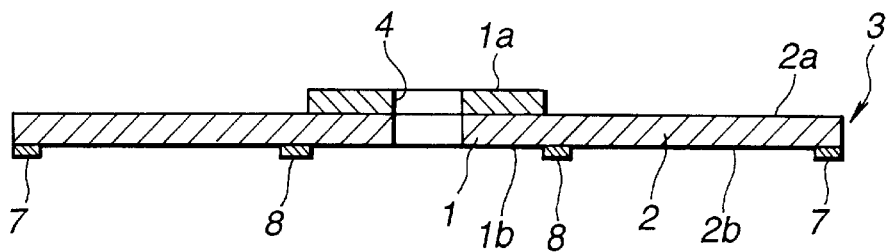
FIG. 3 is a schematic sectional view of a third embodiment of the optical disc substrate of the present invention, showing the essential portion thereof.

FIG. 3 shows the third embodiment of the optical disc according to the present invention. This optical disc substrate has a generally same structure as the optical disc substrate 3 having previously been described with reference to FIG. 1. Therefore, same elements as in FIG. 1 will be indicated with same reference numerals and will not be described any further herebelow.

Needless to say, the third embodiment of the optical disc substrate 3 in FIG. 3 has a similar effect to that of the optical disc substrate shown in FIG. 1.

As shown in FIG. 3, the optical disc substrate 3 has an annular projection 7 formed along the circumference of the side 2b opposite to the side 2a being the recording surface, and also an annular projection 8 formed between the side 2b and the side 1b opposite to the side 1a being the disc supporting surface. The projections 7 and 8 are 10 μm high, for example. It should be noted that the projections may be formed during molding of the optical disc substrate 3 or formed by printing after the molding.

Being put into contact with a disc driving means when the optical disc is mounted on the disc driving means with the sides 1b and 2b placed facing the disk driving means, the projections 7 and 8 will support the optical disc substrate 3. The side 2b opposite to the side 2a being the recording surface of the recording portion 2 will have no contact with the disk driving means, thus the recording surface will not be scratched.

Figure 4:
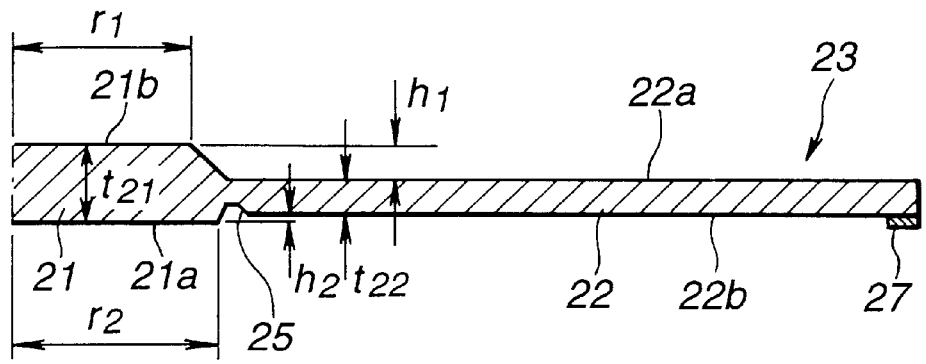
FIG. 4 is a schematic sectional view of a fourth embodiment of the optical disc substrate of the present invention, showing the essential portion thereof.

FIG. 4 shows the fourth embodiment of the optical disc according to the present invention. The optical disc has a diameter of 120 mm, for example. It comprises an optical disc substrate 23 consisting of a disc supporting portion 21 formed around the center thereof and of which one side 21a provides a disc supporting surface at which the optical disc is to be mounted on a disc driving means and a recording portion 22 formed between the disc supporting portion 21 and a circumference thereof and of which one side 22a provides a recording surface.

On the supposition that the disc supporting portion 21 has a thickness of $t_{21}$ and the recording portion 22 has a thickness of $t_{22}$, the optical disc substrate 23 is designed to have such a structure that $t_{21}<t_{22}$, $0.6<t_{21}\leq1.2$, and $0.570\leq t_{22}\leq0.643$.

In this embodiment, the optical disc substrate 23 is also designed so that the side 21a of the disc supporting portion 21 at which the optical disc is to be mounted on a disc driving means and the side 22a of the recording portion 22 will not lie together in a same plane. Also, supposing that there are a gap $h_1$ between the side 21b opposite to the side 21a of the disc supporting portion 21 at which the disc is to be mounted on a disc driving means and the side 22a of the recording portion 22 on which information is to be recorded, and a gap $h_2$ between the side 21a of the disc supporting portion 21 at which the disc is to be mounted on the disc driving means and the side 22b opposite to the side 22a of the recording portion 22 on which information is to be recorded, the optical disc substrate 23 is designed to meet the following:

$$t_{21}=t_{22}+h_1+h_2$$
$$0\leq h_1<0.6$$
$$h_1>h_2$$

Namely, the side 21a protrudes from the side 22b while the side 21b protrudes from the side 22a.

Therefore, the optical disc substrate 23 of the present invention is compatible with an optical system of a high NA (numerical aperture) in an optical disc drive. Moreover, since the substrate 23 is sufficiently rigid to be of a single-plate structure.

It should be appreciated that a layer of an ultraviolet-settable resin should preferably be formed on the other side 22b thereof opposite to the side 22a being the recording surface of the optical disc substrate 23. In this case, the ultraviolet-settable resin layer thus formed can prevent the optical disc substrate 23 from absorbing moisture in the atmosphere to inhibit the optical disc substrate 23 from being deformed due to a change of the ambient humidity.

Moreover, when the optical disc substrate 23 according to this embodiment is designed to have a single-plate structure, the optical disc of the present invention is applicable for magneto-optic recording of a magnetic field modulation type. It should be noted that for application of this embodiment for magneto-optical recording, the optical disc has formed on the side 22a thereof a recording layer as well as a layer of SiN or $S_iO_2$. Thus, a warp likely to occur on either side of the optical disc due to a stress caused at the time of forming the layer, or a temperature change, will cancel each other. Also, by properly selecting a refractive index and thickness of such a layer, the layers can be allowed to serve as a reflection-preventive or scratch-protective layer.

Further, when the disc supporting portion 21 of this optical disc is designed to have a thickness $t_{21}$ of about 1.2 mm, a disk driving means used in a disc drive for CD and DVD can be used in common to drive the optical disc of the present invention, which is also desired against any increased running cost.

Also, when the recording portion 22 is designed to have a thickness $t_{22}$ of 0.6 mm or so in this embodiment of the optical disc substrate 23, an objective lens used in an optical disc drive for DVD can be used commonly for reading information from the optical disc of the present invention, which will also desirably keep the running cost from increasing.

Therefore, a disc driving means and reproducing system of an optical disc drive for CD and DVD can also be used commonly to play this embodiment of optical disc, which is also desired against any increased running cost.

Furthermore, because of the single-plate structure of the substrate 23 in the optical disc of the present invention, the laminating process required for a conventional optical disc having a double-plate laminate structure is not required for the present invention. Thus the optical disc according to the present invention can be manufactured with a half of the material cost as well as with a higher productivity.

Also the optical disc substrate 23 according to the present invention weighs a half of such a conventional optical disc having the double-plate laminate structure. Namely, a driving spindle of an optical disc drive is applied with only a half of the weight of such a conventional optical disc and thus the surface deflection of the disc being spun can be effectively suppressed.

The optical disc substrate 23 has an annular recess 25 formed between the side 21a of the disc supporting portion 21 and the side 22b of the recording portion 22 to eliminate the problems encountered during the process of molding the substrate 23.

As shown in FIG. 4, the optical disc substrate 23 has also an annular projection 27 formed along the circumference of the side 22b opposite to the side 22a being the recording surface. The annular projection 27 has a height equal to the gap $h_2$. It should be noted that the projection 27 may be formed during molding of the optical disc substrate 23 or formed by printing after the molding.

In this embodiment of the optical disc substrate 23, the side 21a of the recording portion 21 protrudes relative to the side 22b of the recording portion 2 and the projection 27 is also formed on the side 22b. Therefore, being put into contact with a disk driving means when the optical disc is mounted on the disk driving means with the sides 21b and 22b placed facing the disc driving means, the projection 27 will support the optical disc substrate 23, so that the side 22b opposite to the side 22a being the recording surface of the recording portion 2 will have no contact with the disc driving means, thus the recording surface will not be scratched. That is, the disc supporting portion 21 of this optical disc substrate 23 will serve itself as the projection 8 formed between the sides 1b and 2b of the substrate 3, having been described in the above with reference to FIG. 3.

Further, in the optical disc substrate 23, the side 21a of the disc supporting portion 21 has a radius $r_2$ larger than a radius $r_1$ of the side 21b opposite to the side 21a to prevent the side 21b from colliding with a magnetic coil.

Figure 5:
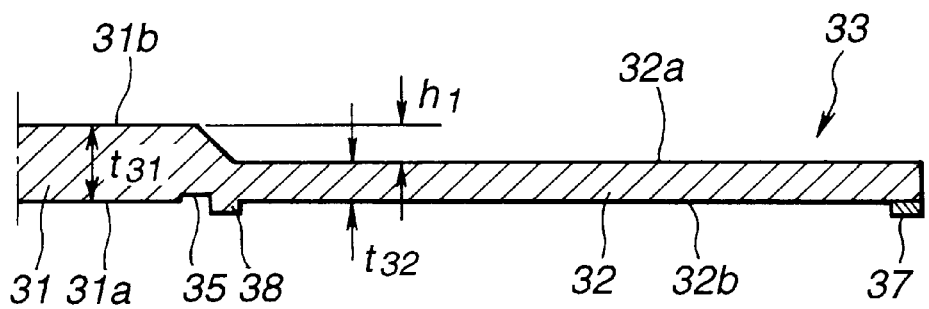
FIG. 5 is a schematic sectional view of a fifth embodiment of the optical disc substrate of the present invention, showing the essential portion thereof.

FIG. 5 shows the fifth embodiment of the optical disc according to the present invention. The optical disc has a diameter of 120 mm, for example. It comprises an optical disc substrate 33 consisting of a disc supporting portion 31 formed around the center thereof and of which one side 31a provides a disc supporting surface at which the optical disc is to be mounted on a disc driving means and a recording portion 32 formed between the center and periphery thereof and of which one side 32a provides a recording surface.

On the supposition that the disc supporting portion 31 has a thickness of $t_{31}$ and the recording portion 32 has a thickness of $t_{32}$, the optical disc substrate 33 is designed to have such a structure that $0.6 < t_{31} \leq 1.2$, $0.570 \leq t_{32} \leq 0.643$ and $t_{31} > t_{32}$.

In this embodiment, the optical disc substrate 33 is also designed so that the side 31a of the disc supporting portion 31 at which the optical disc is to be mounted on a disc driving means and the side 32a of the recording portion 32 will not lie together in a same plane. While the side 31a of the disc supporting portion 31 and the side 32a of the recording portion 32 and the side 32a of the recording portion 32 opposite to the sides 31a will lie together in a same plane, the optical disc substrate 33 according to this fifth embodiment is designed to meet a relation $t_{31} = h_1 + t_{32}$ where $h_1$ is a gap between the side 31b of the disc supporting portion 31 opposite to the side 31a at which the disc is to be mounted on the disk driving means and the side 32a of the recording portion on which information is to be recorded. Therefore, the side 31a of the disc supporting portion 31 and the side 32a of the recording portion 32 will not lie together in a same plane.

Also, the optical disc substrate 33 is compatible with an optical system of a high NA (numerical aperture) in an optical disc drive, and sufficiently rigid to be of a single-plate structure.

In the optical disc substrate 33 of the fifth embodiment, an annular recess 35 is formed between the side 31a of the disc supporting portion 31 and the side 32b of the recording portion 32 to eliminate the problems taking place during molding of the substrate 33.

Also in the optical disc substrate 33, an annular projection 37 is formed along the circumference of the side 32b opposite to the side 32a being the recording surface, and an annular projection 38 is formed between the side 32b and the side 31b opposite to the side 31a being the disc supporting surface. The projections 37 and 38 are 10 µm high, for example. It should be noted that the projections may be formed during molding of the optical disc substrate 33 or formed by printing after the molding.

Being put into contact with a disk driving means when the optical disc is mounted on the disk driving means with the sides 31a and 32b placed facing the disk driving means, the projections 37 and 38 will support the optical disc substrate 33. The side 32b of the recording portion 32 opposite to the side 32a being the recording surface will have no contact with the disk driving means, thus the recording surface will not be scratched.

In the foregoing description, forming of a recording layer on the recording surface has not been discussed in detail, but either a single information recording layer or a plurality of such layers may be formed on the recording surface. By forming a plurality of information recording layers, the optical disc according to the present invention has a considerably increased recording capacity. In this case, it is not necessary to turn over the optical disc during playing.

In the foregoing, the present invention has been discussed concerning an optical disc having a diameter of 120 mm, but the optical disc may be designed to have a diameter of 80 mm according to the present invention.

The optical disc substrate having been described with reference to FIG. 4 and an optical disc substrate having a structure shown in FIG. 6 were experimentally examined as to a warping these optical disc substrates incurred. The results of the examinations will be described hereinbelow.

Figure 6:
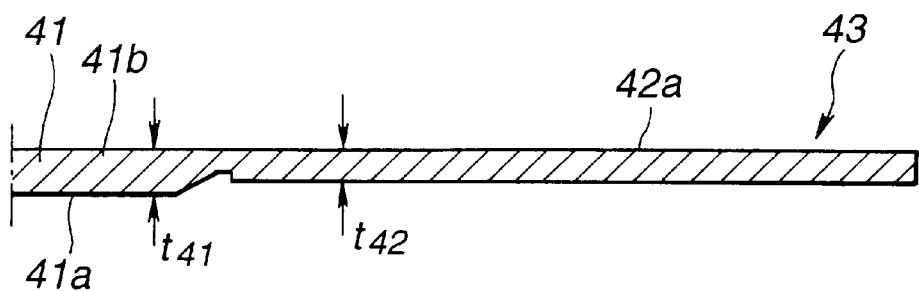
FIG. 6 is a schematic sectional view of a sixth embodiment of the optical disc substrate of the present invention, showing the essential portion thereof.

FIG. 6 shows the sixth embodiment of the optical disc according to the present invention. The optical disc has a diameter of 120 mm, for example. It comprises an optical disc substrate 43 consisting of a disc supporting portion 41 formed around the center thereof and of which one side 41a provides a disc supporting surface at which the optical disc is to be mounted on a disc driving means and a recording portion 42 formed between the disc supporting portion 41 and a circumference thereof and of which one side 42a provides a recording surface.

The optical disc substrate 43 is designed so that the side 41a of the disc supporting portion 41 and the side 42a of the recording portion 42 will not lie together in a same plane because the side 41b of the disc supporting portion 41 opposite to the side 41a and the side 42a of the recording portion 42 are contiguous and lie together in a same plane.

In this optical disc substrate 43, the disc supporting portion 41 was designed to be thicker than the recording portion 42. The recording portion 42 has a thickness $t_{42}$ of about 0.6 mm and the disc supporting portion 41 has a thickness $t_{41}$ of 1.0 mm. Also, an optical disc substrate 43 consisting of the recording portion 42 having the same thickness $t_{42}$ and the disc supporting portion 41 having a thickness $t_{41}$ of 1.2 mm, was also prepared.

It should be noted that these optical disc substrates are manufactured by an injection molding using a mold in which a side thereof providing the recording surface is fixed while a side for providing the disc supporting surface is movable.

Samples each consisting of the disc supporting portion of a following thickness were prepared of the optical disc substrates shown in FIGS. 4 and 6, respectively, under the molding conditions shown in Table 1:

(1) Substrate in FIG. 6 with a disc supporting portion thickness of 1.2 mm (2) Substrate in FIG. 6 with a disc supporting portion thickness of 1.0 mm (3) Substrate in FIG.

4 with a disc supporting portion thickness of 1.2 mm (4) Substrate in FIG. 6 with a disc supporting portion thickness of 1.0 mm (5) Substrate in FIG. 4 with a disc supporting portion thickness of 1.0 mm

TABLE 1

| Sample No. | Symbol | Resin Temp. | Fixed Mold Temp. | Movable Mold Temp. | Cooling time | Injection speed |
|---|---|---|---|---|---|---|
| 1 | × | | 130° C. | 126° C. | 18 sec | |
| 2 | ○ | | 130° C. | 126° C. | 14 sec | |
| 3 | Δ | 340° C. | 130° C. | 126° C. | 20 sec | 175 mm/sec |
| 4 | + | | 130° C. | 130° C. | 20 sec | |
| 5 | □ | | 130° C. | 130° C. | 20 sec | |

Figure 7:
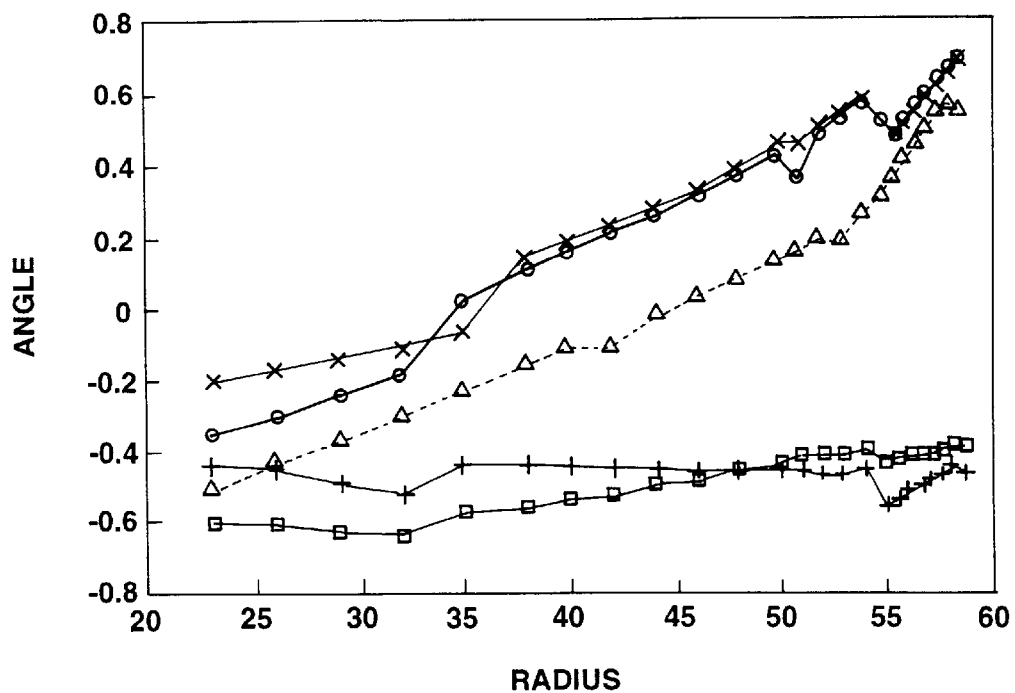
FIG. 7 is a characteristic curve showing the relationship between a radius and angle of a warp of the optical disc substrate.

These sample Nos.1 to 5 were examined as to their warping by measuring an angle defined between a horizontal line and a line tangential to a measuring point. The results are shown in FIG. 7. In FIG. 7, the horizontal axis indicates a distance of the measuring point from the center of the optical disc substrate, namely, a radius of a circle including the measuring point, while the vertical axis indicates an angle defined between the horizontal line and the line tangential to the measuring point. When the angle is zero, it means that the optical disc substrate extends horizontally. When the angle takes a negative value, it means that the substrate is deflecting downward. When the angle takes a positive value, it means that the substrate is deflecting upward. In FIG. 7, the symbol "×" indicates the result of examination of the sample No. 1, "○" indicates the result of examination of the sample No. 2, "Δ" indicates the result of examination of the sample No. 3, "+" indicates the result of examination of the sample No. 4, and "□" indicates the result of examination of the sample No. 5. These sample Nos., symbols and the results of examination are referred to in Table 1.

Figure 8:
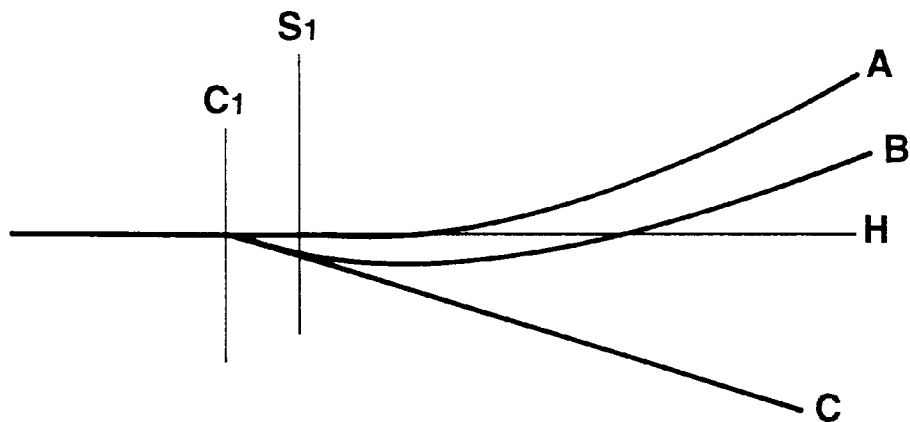
FIG. 8 is a schematic diagram of an example of a relationship between a warp of the optical disc substrate and the boundary between the substrate holding portion and a point at which data recording is to be started.

As seen from FIG. 7, all the samples incurred a radial warping which was greater as it went toward the outer periphery. The results shown in FIG. 7 are schematically shown in FIG. 8. In FIG. 8, the horizontal line is indicated with a reference H. The warping of the samples (1) and (2) is schematically indicated with a curve A in FIG. 8, that of the sample (3) is with a curve B, and that of the samples (4) and (5) is with a curve C.

In these samples, the radius of the disc supporting portion is 18 mm. The end of the disc supporting portion is indicated with a reference $C_1$, and the recording portion extends outwardly of the position $C_1$. In the recording portion, however, information recording will not start at the boundary between the disc supporting and recording portions but at a position outer than the boundary, namely, a radial position indicated with a reference $S_1$. The radial position $S_1$ is 23 mm, for example, off the center of the disc substrate.

Figure 9:
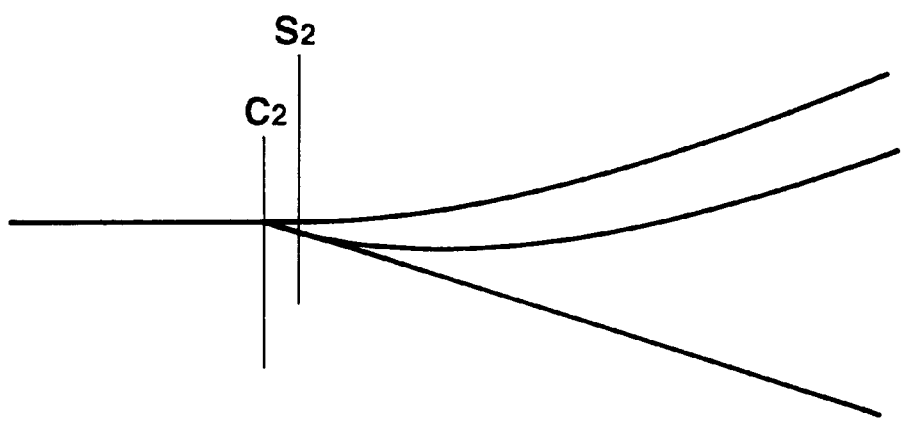
FIG. 9 is a schematic diagram of another example of a relationship between a warp of the optical disc substrate and the boundary between the substrate holding portion and a point at which data recording is to be started.

As evident from the examination results shown in FIGS. 7 and 8, if recording is started at the position $S_1$, information will be recorded in a region where the substrate warp is relatively large, which will result in a deterioration of the reproducing characteristics. To avoid this, the optical disc substrate of the present invention may be designed so that a boundary $C_2$ between the disc supporting portion and recording portion is closest to a recording start point $S_2$ as schematically shown in FIG. 9. Thus, information can be recorded in a region where the substrate warp is relatively small and thus the reproducing characteristics are improved. It should be noted that the closest positioning of the recording start point $C_2$ to the boundary $C_2$ should be a one which will not deteriorate the reproducing characteristics.

Also note that in the optical disc substrate shown in FIG. 6, a side 42b may be a signal layer and a side 41b be a disc supporting surface.

What is claimed is:

1. An optical disc comprising:
   a disc-shaped substrate having an inner peripheral portion and an outer periphery;
   an annular supporting portion overlying and in registry with the inner peripheral portion of the substrate, the supporting portion having a supporting surface on which the optical disc is supported when mounted in a disk driving device; and
   an annular recording portion having a recording surface extending between the supporting portion and the outer periphery,
   wherein,
   in combination, the supporting portion and the inner peripheral portion have a first thickness $T_1$,
   the recording portion has a second thickness $T_2$,
   the disc supporting surface and the recording surface do not lie in the same plane,
   $T_1$ is greater than $T_2$ and $0.6 \leq T_1 \leq 1.2$ mm and $0.57 \leq T_2 \leq 0.643$ mm.

2. The optical disc according to claim 1, wherein an annular recess is formed between the supporting portion and the recording portion, the annular recess effective to serve as a molding secondary gate to reduce birefringence in the disc.

3. The optical disc according to claim 1, wherein the recording portion has a recording surface positioned on a side of the substrate and a projection is formed on the side of recording portion opposite the supporting surface.

4. The optical disc according to claim 1, wherein the recording portion includes a recording surface on one side of the substrate and the disc further comprises at least one functional layer formed on at least a side of the recording portion opposite to the recording surface, the at least one functional layer is effective to suppress deformation of the substrate.

5. An optical disc according to claim 4 wherein an ultraviolet-settable resin layer is formed as the functional layer.

6. An optical disc according to claim 4 wherein a layer of SiN or $SiO_2$ is formed as the functional layer.

7. An optical disc as set forth in claim 4, wherein the one or more functional layers are effective to suppress warping due to thermal changes.

8. An optical disc as set forth in claim 4, wherein the one or more functional layers are effective to suppress warping due to layer stress.

9. An optical disc as set forth in claim 1, wherein the supporting portion and the substrate are of a unitary construction, the supporting portion being a thicker portion of the substrate.

10. An optical disc as set forth in claim 1, wherein the supporting portion as the substrate are not of a unitary construction.

11. An optical disc as set forth in claim 1, wherein the supporting surface and the recording surface are positioned on opposite sides of the substrate.

12. An optical disc as set forth in claim 1, wherein the supporting surface and the recording surface are positioned on the same side of the substrate.

13. An optical disc as set forth in claim 1, further comprising tabs formed on the recording surface effective to support the recording surface in spaced-apart relationship from another surface.

14. An optical disc comprising:

a disc-shaped substrate suitable for compact disc or digital video disc form factor having an inner peripheral portion and an outer periphery;

an annular supporting portion overlying and in registry with the inner peripheral portion of the substrate, the supporting portion having a supporting surface on which the optical disc is supported when mounted in a disk driving device; and an annular recording portion having a recording surface extending between the supporting portion and the outer periphery, wherein, in combination, the supporting portion and the inner peripheral portion have a first thickness $T_1$, the recording portion has a second thickness $T_2$, the disc supporting surface and the recording surface do not lie in the same plane, $T_1$ is greater than $T_2$ and $0.6 \leq T_1 \leq 1.2$ mm and $0.57 \leq T_2 \leq 0.643$ mm.

15. The optical disc according to claim 14, wherein an annular recess is formed between the supporting portion and the recording portion, the annular recess effective to serve as a molding secondary gate to reduce birefringence in the disc.

16. The optical disc according to claim 14, wherein the recording portion has a recording surface positioned on a side of the substrate and a projection is formed on the side of recording portion opposite the supporting surface.

17. The optical disc according to claim 14, wherein the recording portion includes a recording surface on one side of the substrate and the disc further comprises at least one functional layer formed on at least a side of the recording portion opposite to the recording surface, the at least one functional layer is effective to suppress deformation of the substrate.

18. An optical disc according to claim 14, wherein an ultraviolet-settable resin layer is formed as the functional layer.

19. An optical disc according to claim 14, wherein a layer of SiN or $SiO_2$ is formed as the functional layer.

20. An optical disc as set forth in claim 14, wherein the one or more functional layers are effective to suppress warping due to thermal changes.

21. An optical disc as set forth in claim 14, wherein the one or more functional layers are effective to suppress warping due to layer stress.

\* \* \* \* \*